United States Patent
Fukushima

[19]

[11] Patent Number: 5,943,179
[45] Date of Patent: Aug. 24, 1999

[54] DISK DRIVE APPARATUS AND HEAD SWITCHING METHOD

[75] Inventor: Yukio Fukushima, Tokyo, Japan

[73] Assignee: International Business Machines Corporation, Armonk, N.Y.

[21] Appl. No.: 08/747,296

[22] Filed: Nov. 12, 1996

[30] Foreign Application Priority Data

Dec. 25, 1995 [JP] Japan .................................. 7-336722

[51] Int. Cl.⁶ .................................................. G11B 5/596
[52] U.S. Cl. ....................... 360/77.04; 360/63; 360/78.04
[58] Field of Search ........................... 360/77.04, 78.04, 360/78.08, 78.14, 77.02, 77.07, 77.08, 61, 63; 369/32, 44.28; 395/438, 439; 711/4, 111, 112

[56] References Cited

U.S. PATENT DOCUMENTS

| | | | |
|---|---|---|---|
| 5,345,575 | 9/1994 | English et al. ................... | 360/78.04 X |
| 5,404,205 | 4/1995 | Kobayashi et al. .............. | 360/78.07 X |
| 5,463,758 | 10/1995 | Ottesen .............................. | 360/78.04 X |
| 5,506,735 | 4/1996 | Okazaki ............................ | 360/78.04 X |
| 5,523,901 | 6/1996 | Anderson et al. .................. | 360/77.08 |
| 5,677,808 | 10/1997 | Cha et al. ......................... | 360/78.04 X |

*Primary Examiner*—Andrew L. Sniezek
*Attorney, Agent, or Firm*—Roy W. Truelson

[57] ABSTRACT

Tilt values between heads in a disk drive apparatus are previously measured. The measured values are stored in a head switch compensation table. In a head switch operation, a track nearest to the present position of a head to be used after a head switch operation is selected as a target track for the head to be used. A head switch compensation table is stored in a disk. The head switch compensation table stores tilt values represented by a number of tracks which corresponds to a relative deviation between heads. For example, if the table contains data showing that a tilt value between head 1 and head 2 is +1 track, then when heads are switched from head 1 to head 2, a target track for head 2 is selected by adding this value +1 to the current track address on which head 1 is positioned. By this method, head 2 can be positioned on the nearest track by a short time seek operation and can continue a sequential read or write operation.

2 Claims, 11 Drawing Sheets

| a \ b  | Head 0 | Head 1    | Head 2    | ...... | Head n    |
|--------|--------|-----------|-----------|--------|-----------|
| Head 0 | 0      | VR1       | VR2       | ...... | VRn       |
| Head 1 | -VR1   | 0         | VR2 - VR1 | ...... | VRn - VR1 |
| Head 2 | -VR2   | VR1 - VR2 | 0         | ...... | VRn - VR2 |
| ...... | ...... | ......    | ......    | ...... | ......    |
| Head n | -VRn   | VR1 - VRn | VR2 - VRn | ...... | 0         |

FIGURE 6

|        | Head 0 | Head 1 | Head 2 | Head 3 |
|--------|--------|--------|--------|--------|
| Head 0 | 0      | 1      | 0      | -1     |
| Head 1 | -1     | 0      | -1     | -2     |
| Head 2 | 0      | 1      | 0      | -1     |
| Head 3 | 1      | 2      | 1      | 0      |

FIGURE 7

DISK DRIVE APPARATUS AND HEAD SWITCHING METHOD

FIELD OF THE INVENTION

The present invention relates to disk drive data storage devices, and in particular to an improvement of the performance of a head switch operation in a disk drive apparatus having a plurality of heads.

BACKGROUND OF THE INVENTION

Data tracks are concentrically formed on a hard disk. Data is read from or written on a magnetic disk after a seek operation. A head is moved along the radial direction on a rotating magnetic disk and positioned on a desired data track. To position the magnetic head on the desired data track, previously recorded head position identification codes and burst patterns are read by the head as described hereinafter.

The data area and the servo area are formed separately from each other. For example, as schematically shown in FIG. 1, data area 52 and servo area 50 are formed on disk 18. A magnetic head identifies a position on the disk in accordance with the servo data recorded on servo area 50 to write or read data on or from a desired data track.

The information of a cylinder (CYL) and a sector (SEC) is written on a disk as a gray code. Following the gray code, a burst pattern for providing a fine adjustment signal relative to each track is recorded on a disk. By reading this servo data, a magnetic head is positioned on a desired track.

FIG. 2 shows some of the head position identification code and burst patterns recorded on a magnetic disk. In FIG. 2, the magnetic disk rotates along the circumferential direction (direction of the arrow F in FIG. 2) and a magnetic head (not illustrated) moves along the radial direction of the magnetic disk (direction of the arrow G in FIG. 2). A plurality of data tracks 100A, 100B, 100C, . . . on which data is recorded are concentrically formed on the magnetic disk. The data tracks are arranged along the circumferential direction and an identification code recording area 102 and a burst-pattern recording area 104 are formed between adjacent data tracks.

Each data track is previously provided with a track address for identifying itself. The identification code comprises a predetermined number of bits. In these bits, a track address is recorded in the form of a gray code (Cyclic binary code). These bits are recorded in the identification code recording area 102. Moreover, there are a plurality of burst pattern strings (four strings in the case of FIG. 2) 106A, 106B, 106C, and 106D, in which each signal-recorded area (hatched portion in FIG. 2) is arranged along the radial direction of the disk. This burst pattern is recorded in the burst-pattern recording area 104.

To position the magnetic head on a desired data track, the current data track address is calculated in accordance with a read identification code each time the head faces the identification code recording area 102. The one-bit data recording length (L in FIG. 3(A)) in the identification code is previously determined as shown in FIG. 3(A). Therefore, portions to be magnetized to N or S in the recording range L are determined by the bit value "0" or "1" of the gray code representing the track address.

For example, when the magnetic head reads the identification code of data track N shown in FIG. 3(A), a pulse is generated at a portion magnetized to N or S as shown in FIG. 3(B). Moreover, when the magnetic head passes through the identification code recording area of the data track N+1 shown in FIG. 3(A), a pulse is generated at a portion magnetized to N or S as shown in FIG. 3(C). It is possible to identify the value of a gray code recorded in the identification code recording area in accordance with the pulses read. The track address is determined by converting the read gray code to a binary code.

A gray code (100) is identified from the pulse string in FIG. 3(B) and a binary code (111) is obtained by converting the gray code (100). A gray code (000) is identified from the pulse string in FIG. 3(C) and a binary code (000) is obtained by further converting the gray code (000).

When the magnetic head reaches a desired data track, the head reads a plurality of signals obtained from the burst pattern strings in the burst-pattern recording area 104. This burst pattern generates a positioning signal whose level linearly changes in accordance with the position of the magnetic head. The magnetic head is positioned in accordance with the burst pattern signal so that the center of the gap of the magnetic head is located at the desired portion in the desired data track.

In a disk drive apparatus having a plurality of heads, heads are successively switched in a sequential data writing or reading operation. For example, in a disk drive apparatus having two disks and four magnetic heads with head numbers of 0, 1, 2, and 3, the heads are switched in the order of head numbers 0, 1, 2, and 3, and data is written or read. Conventionally, when a data write operation by the magnetic head 0 is terminated on a track of cylinder number 2500, the magnetic head 0 is switched to the magnetic head 1 and data is written at the cylinder 2500 of a disk facing the head 1. Similarly, data is written in the cylinder 2500 by the heads 2 and 3 in order and then, data is written in a cylinder 2501 by magnetic heads 0, 1, 2, and 3.

In a disk drive apparatus having a plurality of heads, each head is conventionally positioned on the corresponding position of the same cylinder number when magnetic heads are switched. In general, servo information for positioning a head is written on each disk surface when the disk drive apparatus is manufactured. As a result, the seek operation for moving a head to a target track is basically unnecessary under an ideal state when heads are changed. As shown in FIG. 4, this is the case in which a head is positioned on a predetermined track and other head is also located on the position of a track at the same cylinder position of an opposing disk. In FIGS. 4 and 5, each head is shown by shifting it in the circumferential direction of a track for ease of understanding. In fact, however, each head is not shifted in the circumferential direction of a track on a disk.

However, when setting a disk on which the servo information is written to a disk drive apparatus, a relative deviation between heads can be caused. This deviation is caused by following reasons. A relative deviation in each head for a deviation of the head's setting position. A gradient of the rotary shaft of the actuator for driving a magnetic head. A gradient of the spindle motor for driving a disk. Deformation of the actuator or spindle motor caused by a clamping force. When servo data is written by a servo writer, a servo pattern is written without any deviation between disks. Thereafter, however, a deformation occurs in a clamp removing process, such as removing the disk drive apparatus from the servo writer. Further another deformation occurs in the process for setting a top cover to the disk drive apparatus. Therefore, magnetic heads may deviate with respect to each other, and be positioned with respect to the disk drive apparatus as shown in FIG. 5. If a head switch operation is performed under the above state, Head 1 must move from Track n+1 on which Head 1 is located to Track n, that is, a seek operation across one track is required for sequential data writing or reading when switching the active head from Head 0 to Head 1.

As the tilt increases, that is, as the distance to the target track increases, the seek time increases. If a long seek operation is required in each head switch operation, the performance in a data write or read operation becomes worse.

SUMMARY OF THE INVENTION

The present invention improves the performance of data write and read operations in a disk drive apparatus provided with a plurality of magnetic heads having a tilt. This improvement can be achieved by minimizing the seek time and head switch time. Particularly, for executing a sequential data read/write operation using a plurality of sectors on a disk, it is necessary to switch heads many times. Therefore, an improvement of performance can be more notable by reducing the seek time in accordance with the present invention.

According to a disk drive apparatus of the present invention, relative tilt values of heads are previously measured, and these tilt values are stored in a table. The stored tilt values are used for determining a track closest to the present position of a head to be used after a head switch operation. This determined track is used as a target track for the head to be used after the head switch. That is, the disk drive apparatus in accordance with the present invention is so constituted that the target track for a head to be used after a head switch operation is determined to minimize the seek time required for positioning the head on a target track.

The disk drive apparatus of the present invention has a head switch compensation table. This table is stored in a predetermined area on a disk and read into a memory, such as RAM or the like accessible by a hard disk controller for practical use. The head switch compensation table contains relative tilt data which represent number of tracks corresponding to the deviation among heads. For example, the table contains data showing that a deviation is +1 track between the Heads 1 and 2. When a write operation is executed at Track n by Head 1 and heads are switched from Head 1 to Head 2, the disk drive apparatus refers to the head switch compensation table and sets a target track for Head 2 to Track n+1 by considering +1 in the head switch compensation table. The data write operation is continuously executed at Track n+1 by Head 2. Thereby, the moving distance from the present position of the Head 2, that is seek distance, decreases and the seek time in the head switch operation can be reduced.

The head switch compensation table is stored in an area other than a user data area on a disk, in which the information for defective sectors or defective tracks of the disk is also stored. The table is read in its entirety immediately after power is supplied to the HDD (hard disk drive). When the HDD is powered on, this table is read from the disk and stored in a sector buffer memory. In an actual data read or write operation, the table stored in the sector buffer is referenced for switching heads.

As described above, in accordance with the present invention, it is possible to greatly improve the performance at the time of a data read/write operation by decreasing the seek time for a head switch in a disk drive apparatus having a plurality of heads.

BRIEF DESCRIPTION OF THE DRAWINGS

FIG. 6 shows a general head switch compensation table used for the disk drive apparatus of the present invention;

FIG. 7 shows a specific head switch compensation table used for the disk drive apparatus of the present invention;

DETAILED DESCRIPTION OF THE PREFERRED EMBODIMENT

Figure 1:
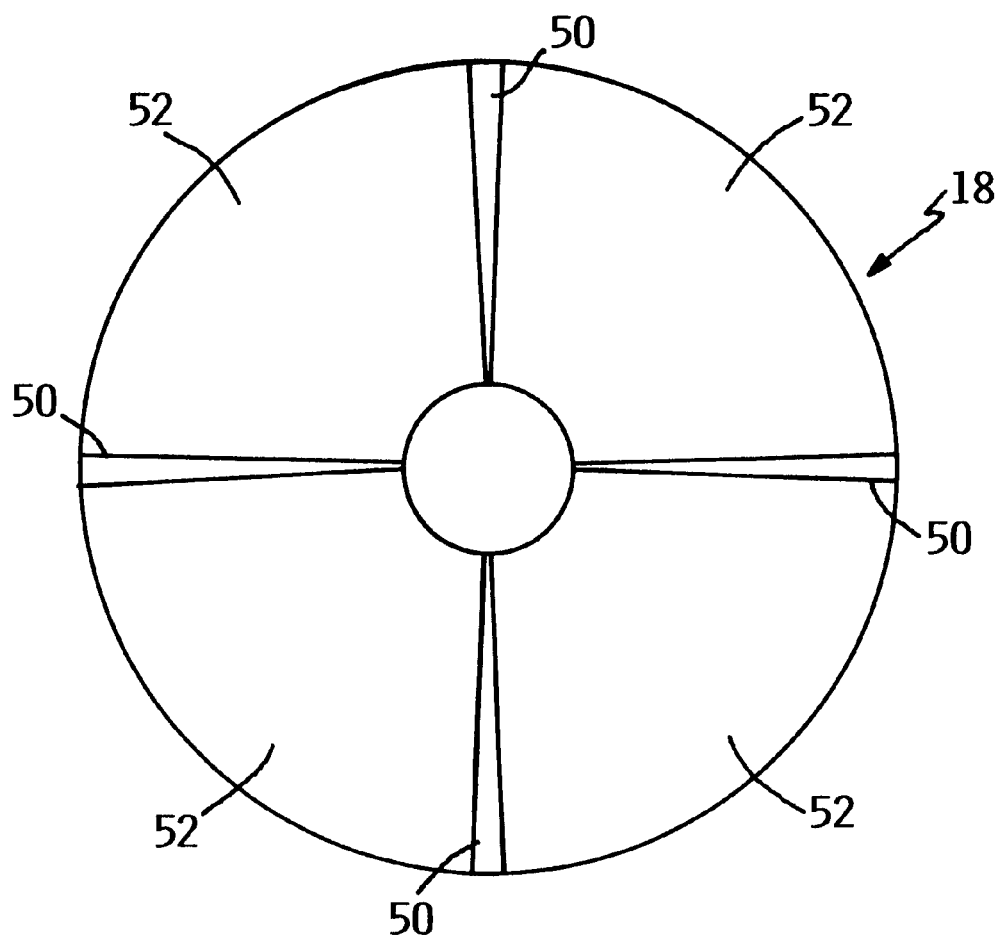
FIG. 1 shows a magnetic disk of the present invention.
Figure 2:
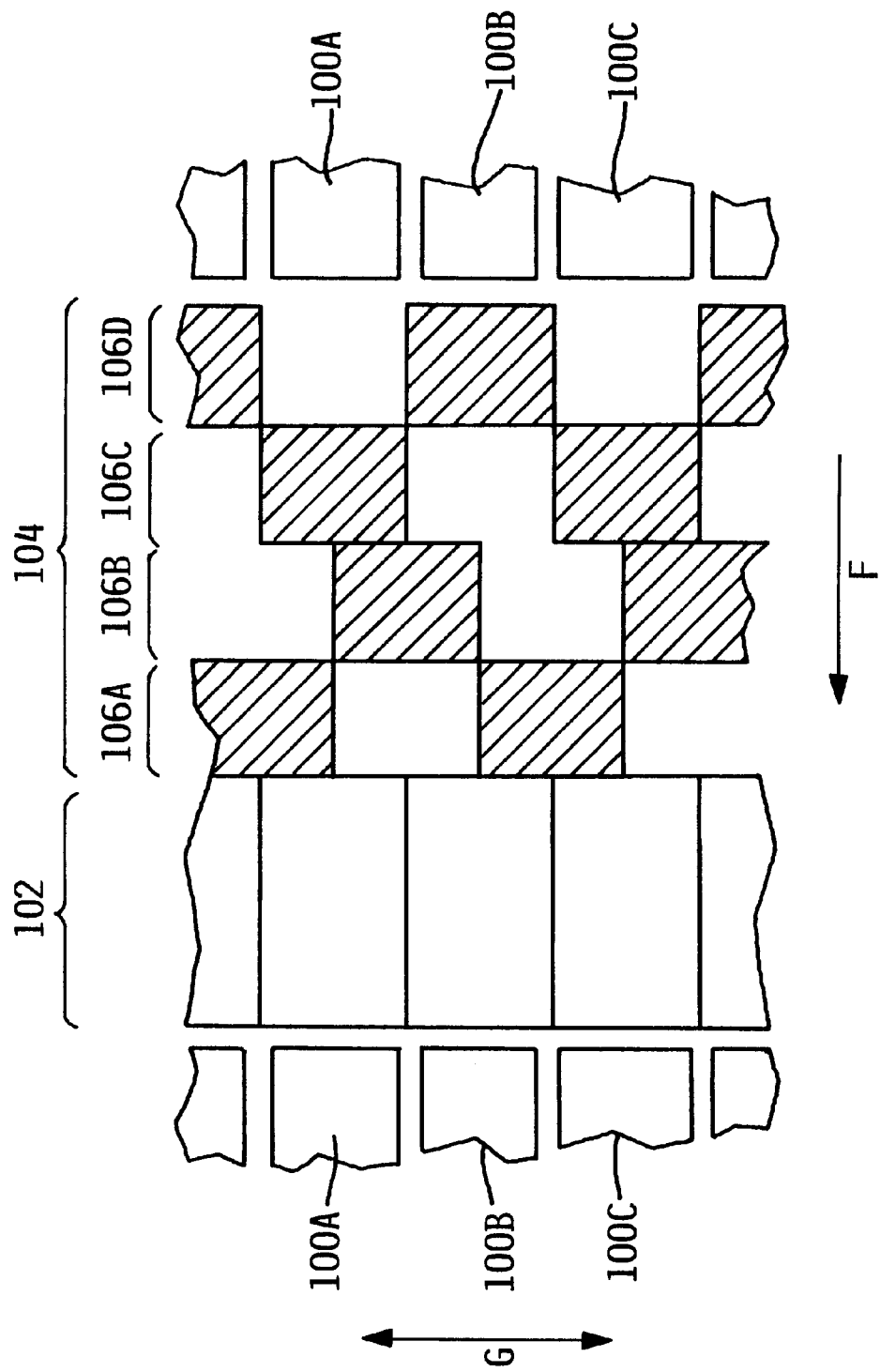
FIG. 2 shows a identification code recording area recorded on a magnetic disk.
Figure 3A:
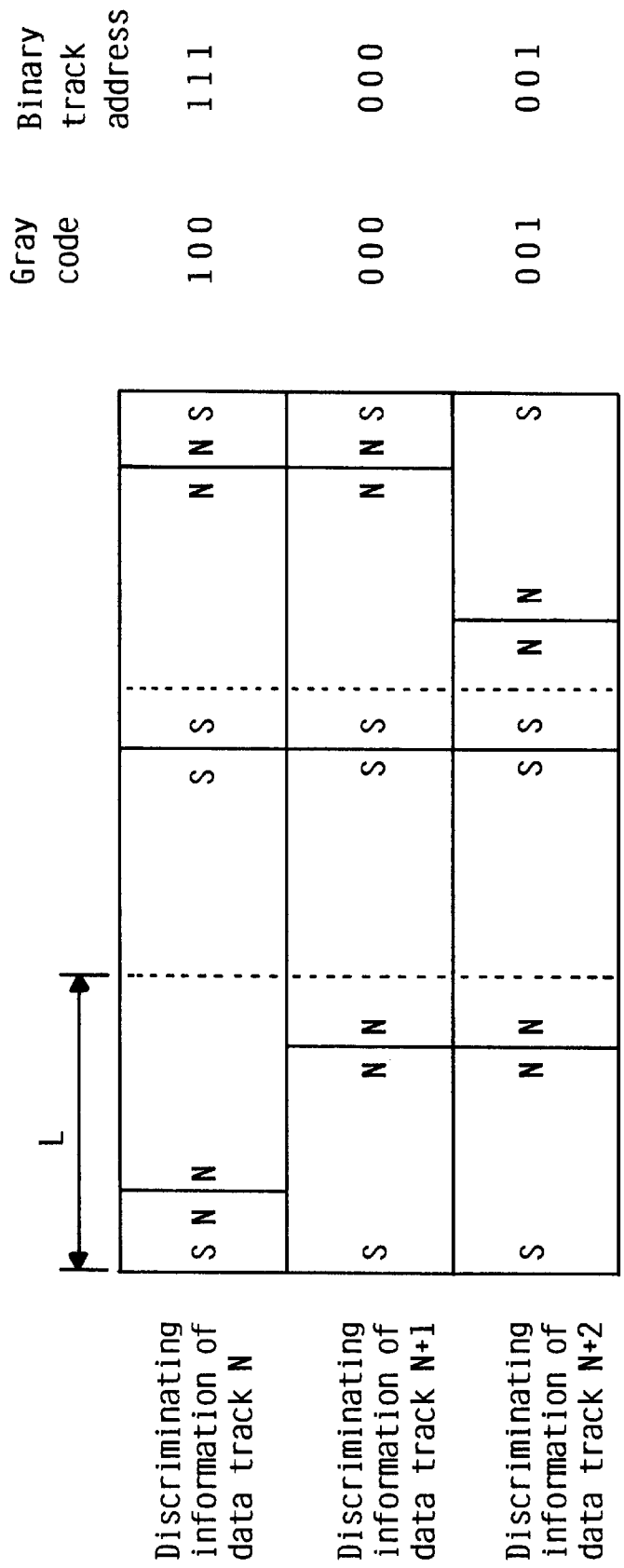
FIGS. 3(a) to 3(c) show a diagram for explaining a gray code of a magnetic disk.
Figure 3B:
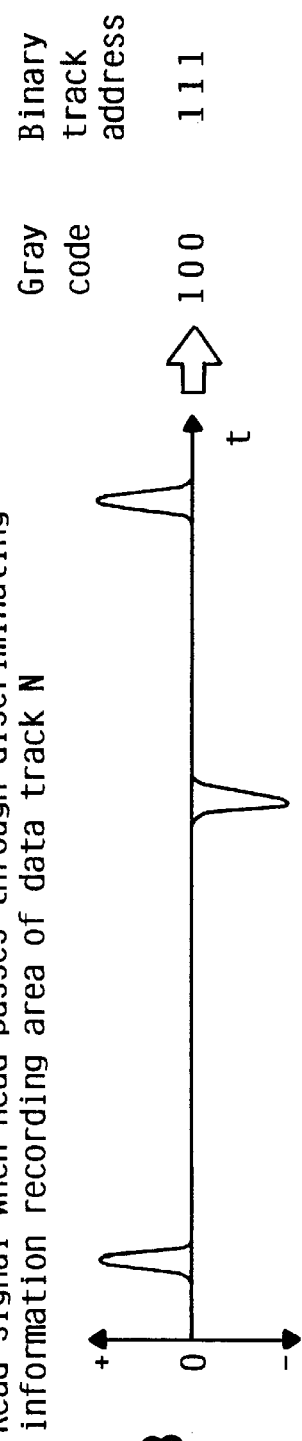
Figure 3C:
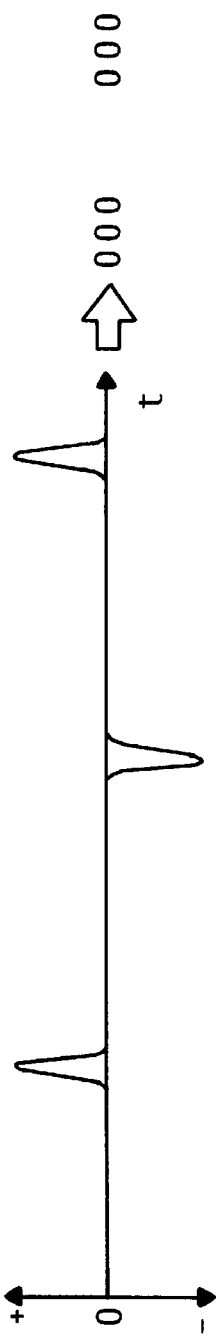
Figure 4:
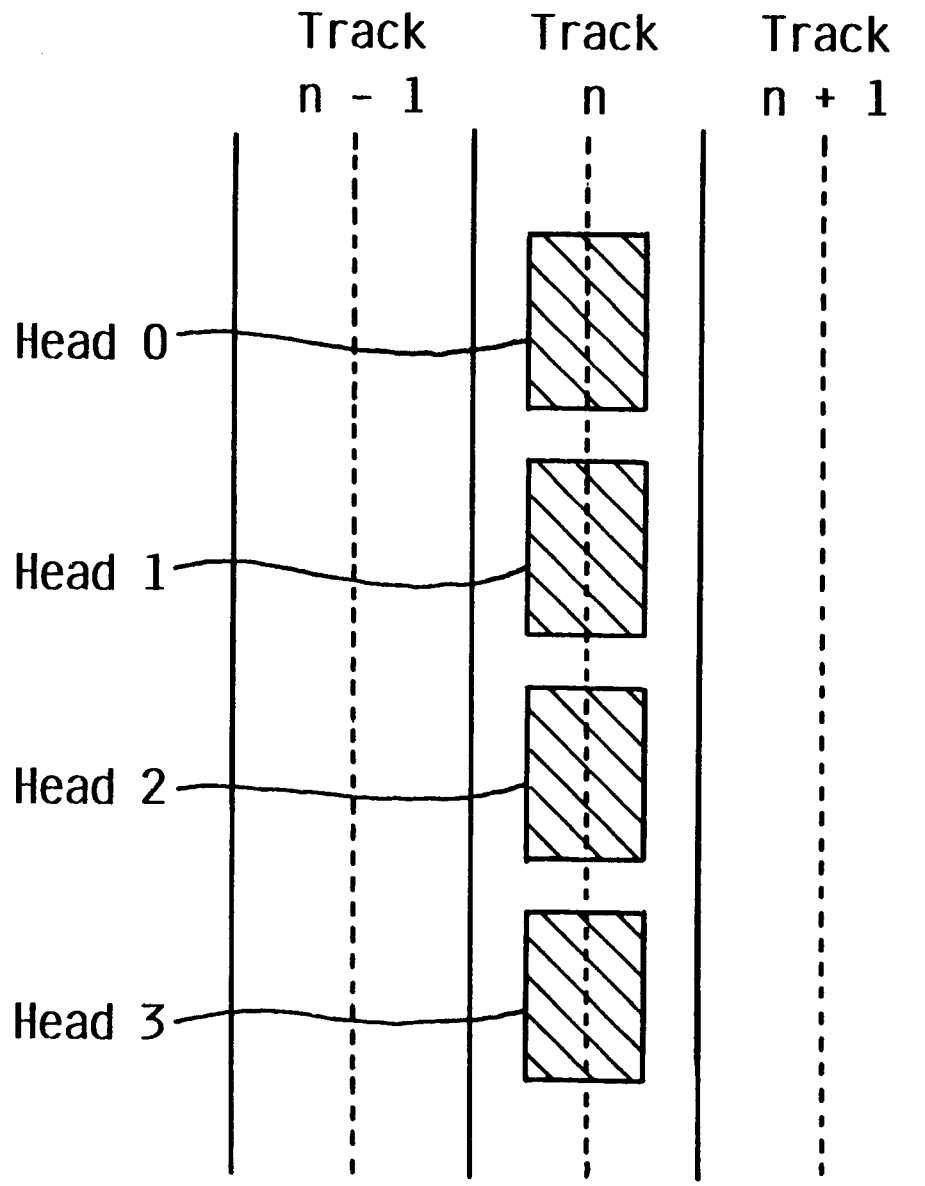
FIG. 4 shows the relative position of each head when servo information is written in a magnetic disk.

The following reference numbers used in the figures identify the features listed:

18 . . . Disk
50 . . . Servo area
52 . . . Data area
84 . . . Spindle motor driver
85 . . . VCM driver
86 . . . MPU
87 . . . AMP
88 . . . Read/write channel
89 . . . Memory
90 . . . HDC
100 . . . Data track
102 . . . Identification code recording area
104 . . . Burst pattern area
106 . . . Burst pattern In accordance with the present invention, relative tilt values between heads in a disk drive apparatus are previously measured. That is, relative deviations between heads in the radial direction of a disk are measured. The relative tilt value is measured after assembly of the disk drive apparatus. The relative tilt value is measured by obtaining accurate positional information of each head from the servo information written on the disk.

In case of a disk drive apparatus having n+1 heads, designated Head 0 to Head n, relative tilt values between heads are measured as follows. As to each head, a tilt value from Head 0 is measured and the measured tilt value is expressed as a number of tracks. That is, in each head, the measured tilt value is divided by the value of a track width. Therefore, the resultant values show number of tracks equivalent to the tilt values from Head 0.

| |
|---|
| Head 0: 0 |
| Head 1: V1 |
| Head 2: V2 |
| . |
| . |
| . |
| Head n: Vn |

The relative tilt values V1, V2, V3,..., and Vn are rounded to integers. As a result, the following integral numbers of tilt tracks are calculated.

| |
|---|
| Head 0: 0 |
| Head 1: VR1 |
| Head 2: VR2 |
| . |
| . |
| . |
| Head n: VRn |

FIG. 6 shows a table having the data of relative tilt values among Heads 0, 1, 2, ..., and n. In FIG. 6, each value shows a tilt value on the assumption that a head is switched from a head in column "a" to a head in row "b".

Figure 5:
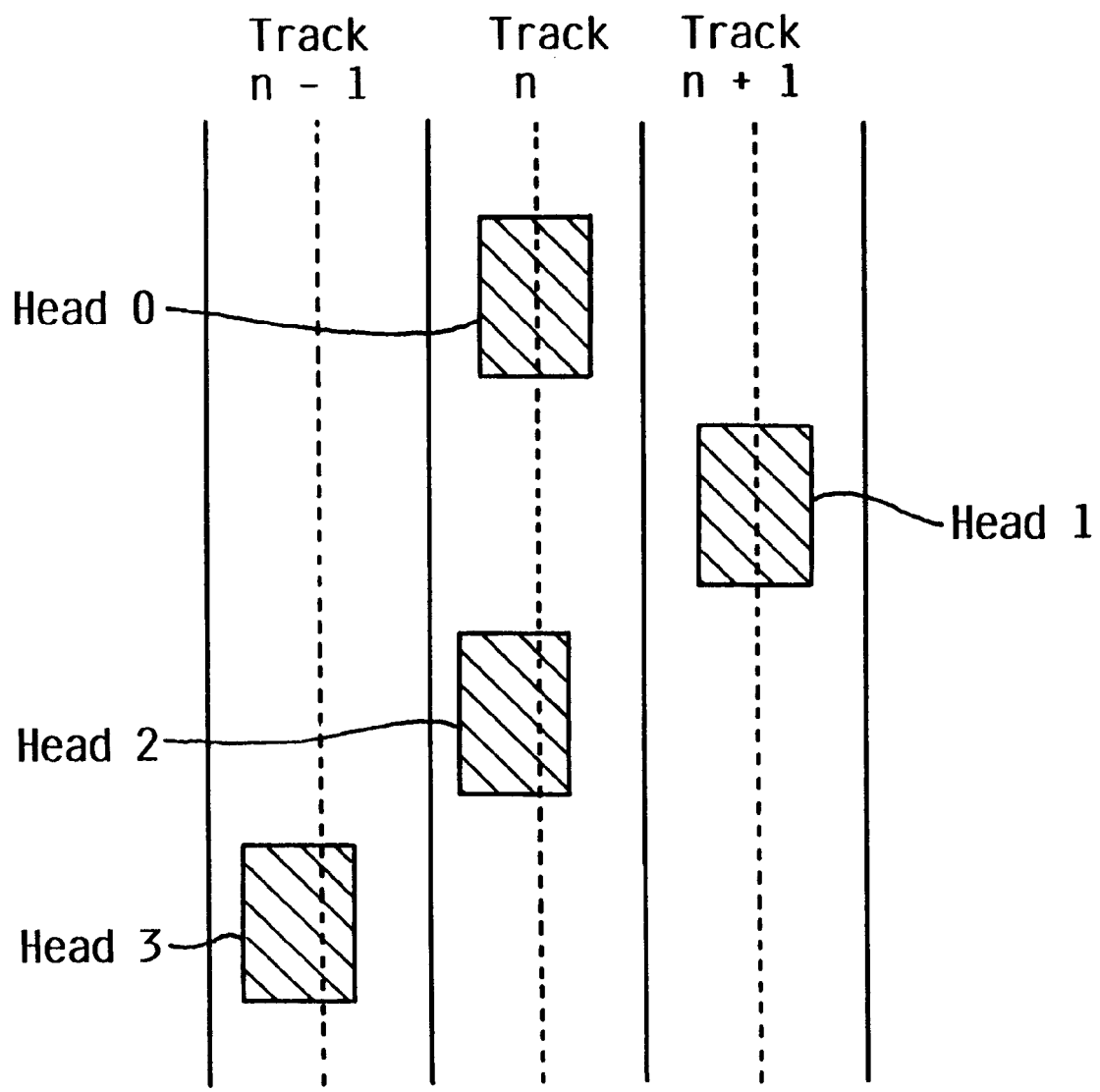
FIG. 5 shows the relative position of each head after a magnetic disk is assembled.

For example, the table shown in FIG. 7 can be obtained as a head switch compensation table of a 4-head disk drive apparatus having tilts shown in FIG. 5. For example, it is found from the table in FIG. 7 that the tilt value is +1 track when switching heads from Head 0 to Head 1. When switching heads from Head 1 to Head 2, the tilt value is −1. A target track for head switch is determined by using this table.

A target track is determined by designating a gray code. The gray code has a code for identifying a track as described above. In a conventional disk drive apparatus, for example, when writing data on Track 250 by Head 0 and thereafter Head 0 is switched to Head 1 during continuous data writing (sequential write), Head 1 is moved to Track 250 on a disk. In accordance with the present invention, when switching heads from Head 0 to Head 1 during continuous data writing, the tilt value "1" is read from the head switch compensation table shown in FIG. 7. This tilt value "1" is the data showing the tilt value of Head 1 against Head 0 as shown in FIG. 7. For determining the target track for Head 1, this value "1" is added to the present track 250. As a target track for Head 1, 250+1=251 is obtained. In this way, a target track address 251 for Head 1 is determined.

A target address is shown by the following equation.

Target address=Cylinder ID+Offset+Number of defective tracks

In this equation, Cylinder ID represents an identification value showing the cylinder (track) number, Offset represents the number of skipped tracks from the outer crash stop serving as a head-movable outermost peripheral position to an actual data track to be used. Number of defective tracks represents the number of tracks to be skipped due to defective sectors or the like.

To change from Head X to Head Y, the target address (y) showing a target track for Head Y is shown by the following equation.

Target address (y)=Cylinder ID(x)+Offset+Number of defective tracks+VR(x to y)

In this equation, VR(x to y) represents a tilt value read from the head switch compensation table when Head X is switched to Head Y. Cylinder ID(x) represents the cylinder ID where Head X is positioned. Offset represents a value peculiar to the disk drive apparatus, and number of defective tracks represents the number of tracks to be skipped which is previously stored common value to each head.

As a specific example in accordance with the present invention, in FIG. 5, assume that Track n where Head 0 is located is cylinder 2500, the offset is 50, and the number of defective tracks is 1. In this condition, the track address where Head 0 is located is obtained as shown below.

Address (0)=2500+50+10=2560

The target address for Head 1 when switching heads from Head 0 to Head 1 is obtained as shown below.

Target address (0 to 1)=2500+50+10+1=2561

In this case, Head 1 is already positioned at Track n+1 as shown in FIG. 5. That is, the track position where Head 1 is located is on a cylinder of 2561. Therefore, the time required for the seek operation of Head 1 to the target track is very short.

Figure 8:
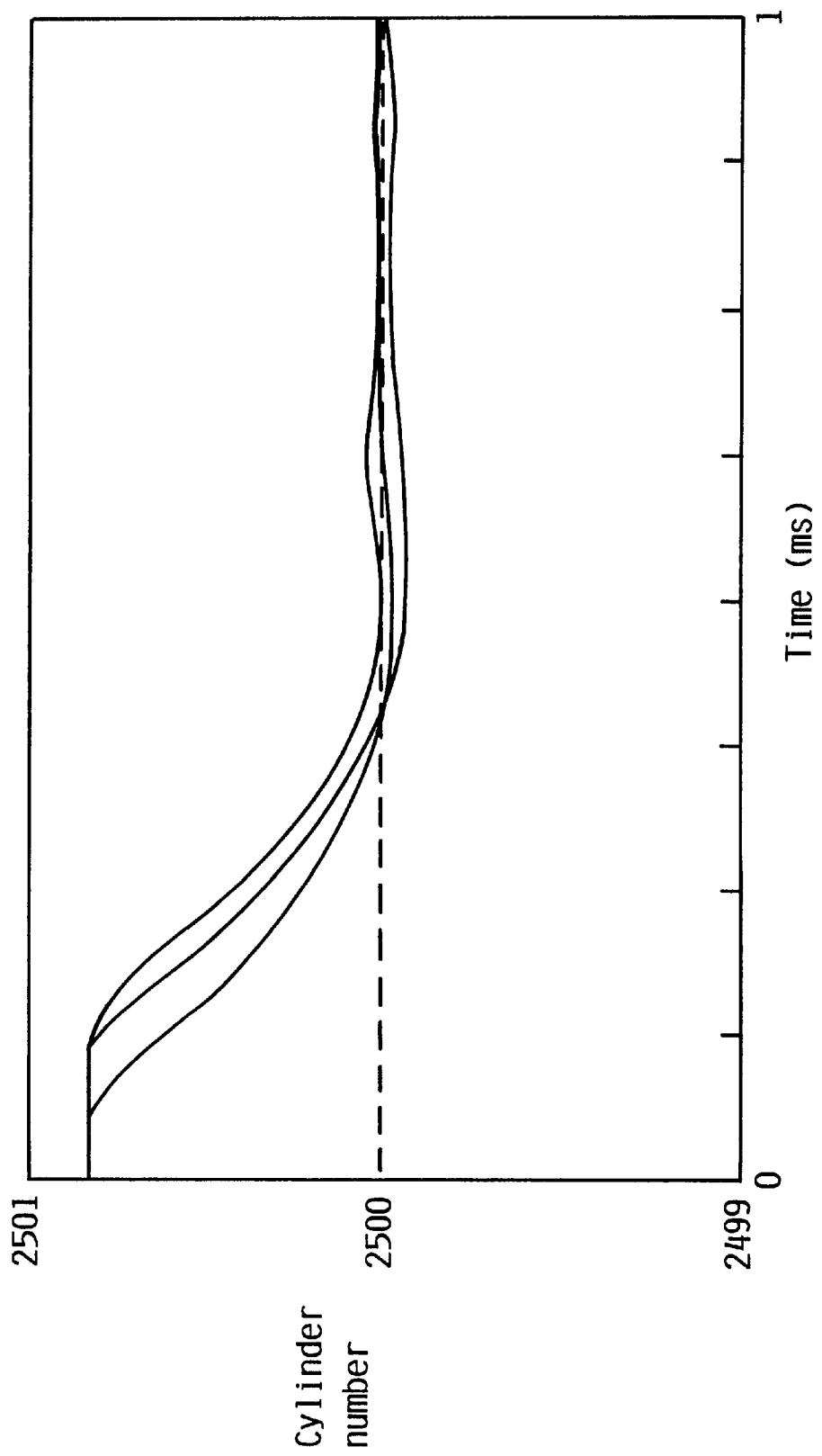
FIG. 8 shows a seek profile in a conventional disk drive apparatus.
Figure 9:
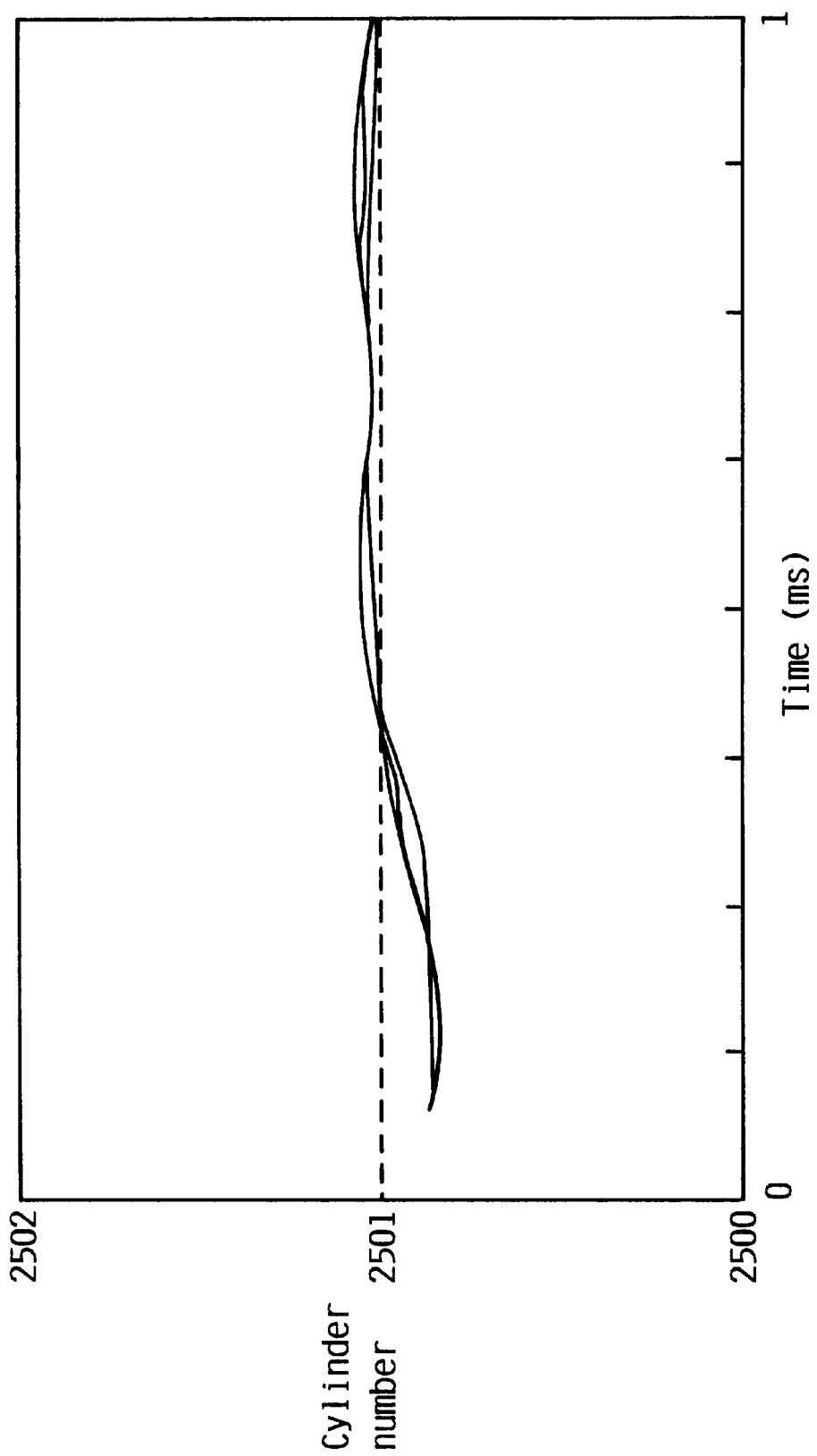
FIG. 9 shows a seek profile in the disk drive apparatus of the present invention.

FIGS. 8 and 9 show seek profiles when switching from Head 0 to Head 1 in an apparatus which has heads having a tilt equivalent to 0.8 tracks. FIG. 8 shows the profiles of a conventional disk drive apparatus and FIG. 9 shows the profile of a disk drive apparatus having a head switch compensation table according to the present invention. In the case of the conventional disk drive in FIG. 8, the time required for positioning a head on a target track, that is, a seek time is approximately 2.0 msec. However, as shown in FIG. 9, when using the head switch compensation table of the present invention, the seek time is approximately 1.0 msec. Therefore, the seek time is greatly decreased.

In FIG. 8, because the tilt between heads is approximately 0.8 tracks, the seek operation is started from a point approximately 0.8 tracks distant from the target track 2500. That is, the head must move a distance of 0.8 tracks. In FIG. 9, however, track 2501 is used as a target track, which is the closest to the present position of Head 1. Accordingly, the head moving distance is short and thus, the seek time can be decreased.

Figure 10:
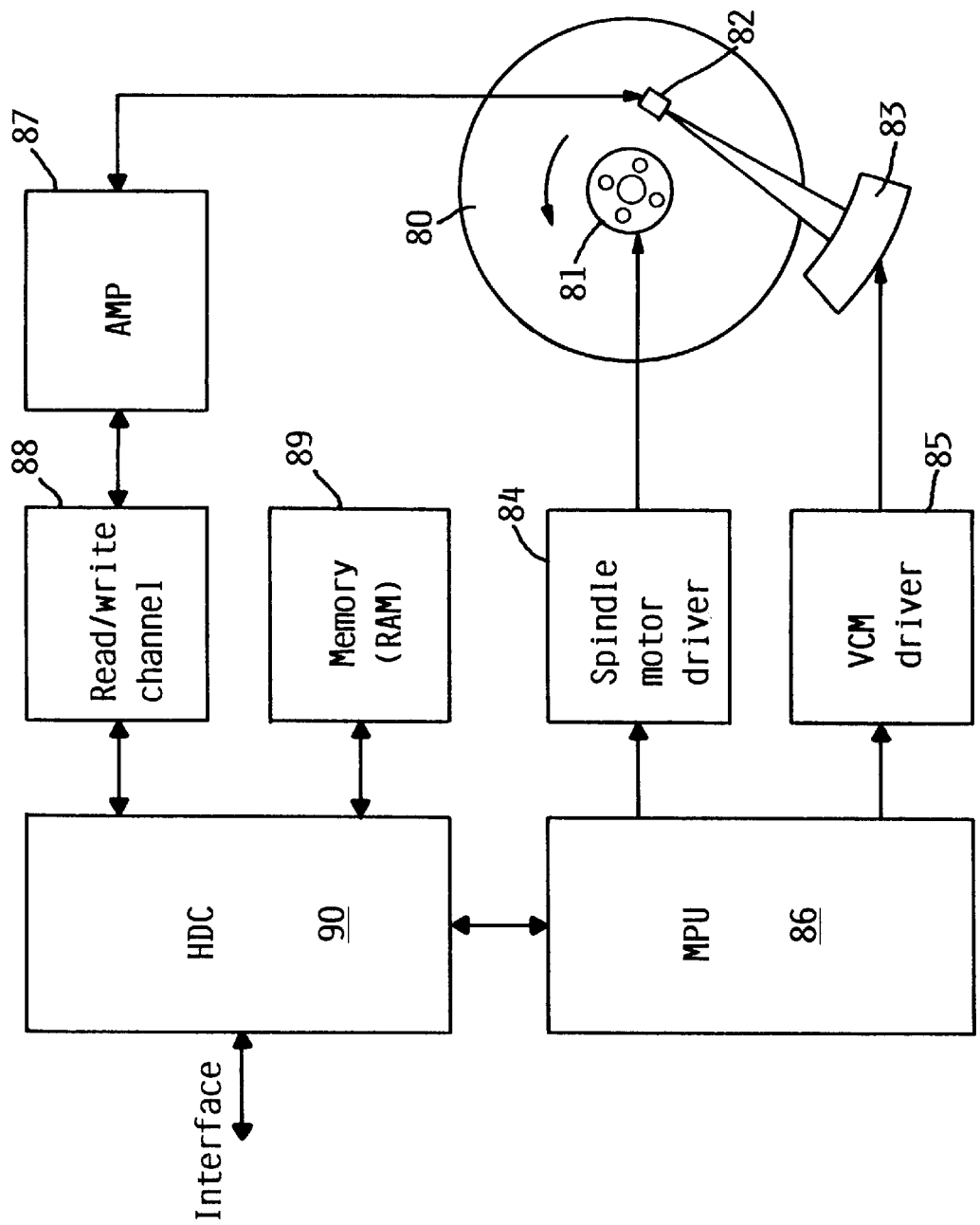
FIG. 10 shows a block diagram showing the disk drive apparatus of the present invention.

FIG. 10 shows a block diagram of one example for realizing the present invention. Disk 80 rotates at a high speed integrally with spindle motor 81. Data recorded on disk 80 is read by head 82 and data is written on disk 80 by head 82. Head 82 is moved by VCM (voice coil motor) 83. FIG. 10 shows a top view of the disk drive apparatus in which only a single head and corresponding disk surface is visible, it being understood that the disk drive apparatus contains at least one other head and corresponding disk surface not visible in the top view of FIG. 10. Spindle motor 81 and VCM 83 are controlled by spindle motor driver 84 and VCM driver 85, which are connected to MPU (microprocessor unit) 86. Transfer of a signal through head 82 is executed through AMP 87, read/write channel 88, and HDC (hard disk controller) 90. HDC 90 can be connected with a host through an interface. HDC 90 is connected with memory 89 which is used as a sector buffer memory for temporarily storing the data mainly used for read/write. A head switch compensation table of the present invention is also stored in memory 89 and a head switch operation is executed by referring to the head switch compensation table in memory 89 when heads are switched.

An operation started by an input of a data read command to HDC 90 from a host through an interface is described below. When a read command is received by HDC 90, HDC 90 notifies MPU 86 that a command is input. MPU 86 determines that the input command is a read command and obtains numbers of a cylinder (track), head, and sector to be sought. MPU 86 confirms a tilt value between a presently used head and a head to be used next by referring to a head switch compensation table. From the values in the table, a target gray code is calculated. The head to be used next is positioned on a target track in accordance with the calculated gray code. After the head is positioned at the target track, MPU 86 reads data from the positioned sector. When the data to be read is recorded continuously to the other disk, MPU 86 confirms the tilt between heads by using the head switch compensation table. From the values in the table, the next target gray code is calculated. In accordance with the calculated gray code, a head switch and seek operation is executed. After the head switch and seek operation is completed, MPU 86 reads the next data with a switched head.

Also when writing data, MPU 86 similarly changes heads by referring to the head switch compensation table. Because the table is stored in memory 89, the time for referring to the table is negligible. Therefore, a seek operation executed in a head switch can be performed so as to move the head to the nearest track by referring to the head switch compensation table. A read or write operation, particularly in a sequential data reading or writing which requires a plurality of head switches, can be executed more efficiently.

Although a specific embodiment of the invention has been disclosed along with certain alternatives, it will be recognized by those skilled in the art that additional variations in form and detail may be made within the scope of the following claims.

What is claimed is:

1. A disk drive apparatus, comprising:

a plurality of disk surfaces for recording data, each said disk surface being formatted to contain a plurality of tracks of data and a plurality of embedded servo patterns for identifying said tracks, said disk surfaces being rigidly attached to a hub for rotation in unison about a common axis;

a plurality of heads for accessing data recorded in tracks on said plurality of disk surfaces, each said head opposing a respective disk surface, said heads being positioned in unison by a common actuator;

a read/write channel coupled to said heads for communicating electronic signals representing data and servo information;

an actuator driver for moving said actuator to position said heads;

electronic processing and control apparatus for controlling the operation of said disk drive, said electronic processing and control apparatus being coupled to said read write channel and said actuator driver, wherein said electronic processing and control apparatus selects a head to be used for data access operations and a track to be accessed, and wherein, in response to switching a head to be used for a sequential data access operation, said electronic processing and control apparatus determines a target track to be accessed by using a relative tilt value in the radial direction of a disk between a head accessing data immediately before switching heads and a head to access data immediately after switching heads, said relative tilt value representing a relative track offset between said heads at a constant position of said common actuator, said electronic processing and control apparatus further comprising a head switch compensation table for storing a plurality of relative tilt values among said heads, said relative tilt value being derived before said sequential data access operation is performed, said relative tilt values comprising integers obtained by rounding a value calculated by dividing a measured relative tilt of each head in the radial direction of a disk by a track width.

2. The disk drive apparatus according to claim 1, wherein said electronic processing and control apparatus comprises (a) a programmable processor; and (b) a memory.

* * * * *